(12) United States Patent
Blocksome et al.

(10) Patent No.: US 8,032,892 B2
(45) Date of Patent: Oct. 4, 2011

(54) MESSAGE PASSING WITH A LIMITED NUMBER OF DMA BYTE COUNTERS

(75) Inventors: Michael Blocksome, Rochester, MN (US); Dong Chen, Croton on Hudson, NY (US); Mark E. Giampapa, Irvington, NY (US); Philip Heidelberger, Cortlandt Manor, NY (US); Sameer Kumar, White Plains, NY (US); Jeffrey J. Parker, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1134 days.

(21) Appl. No.: 11/768,813

(22) Filed: Jun. 26, 2007

(65) Prior Publication Data
US 2009/0007141 A1   Jan. 1, 2009

(51) Int. Cl.
*G06F 9/44* (2006.01)
*G06F 9/46* (2006.01)
*G06F 13/00* (2006.01)
*G06F 15/167* (2006.01)

(52) U.S. Cl. ........ 719/312; 719/313; 719/314; 709/212; 709/213

(58) Field of Classification Search .......... 719/312–314; 709/212–213
See application file for complete search history.

(56) References Cited

U.S. PATENT DOCUMENTS

| | | | |
|---|---|---|---|
| 4,777,595 A | 10/1988 | Strecker et al. | |
| 5,063,562 A | 11/1991 | Barzilai et al. | |
| 5,142,422 A | 8/1992 | Zook et al. | |
| 5,349,587 A | 9/1994 | Nadeau-Dostie et al. | |
| 5,353,412 A | 10/1994 | Douglas et al. | |

(Continued)

OTHER PUBLICATIONS

Definition of "mechanism", Oxford English Dictionary, http://dictionary.oed.com/cgi/entry/00304337?query_type=word&queryword=mechanism&first=1&max_to_show=10&sort_type=alpha&result_place=2&search_id=y2atElGc-11603&hilite+00304337.

(Continued)

*Primary Examiner* — Qing Wu
(74) *Attorney, Agent, or Firm* — Scully, Scott, Murphy & Presser, P.C.; Daniel P. Morris, Esq.

(57) ABSTRACT

A method for passing messages in a parallel computer system constructed as a plurality of compute nodes interconnected as a network where each compute node includes a DMA engine but includes only a limited number of byte counters for tracking a number of bytes that are sent or received by the DMA engine, where the byte counters may be used in shared counter or exclusive counter modes of operation. The method includes using rendezvous protocol, a source compute node deterministically sending a request to send (RTS) message with a single RTS descriptor using an exclusive injection counter to track both the RTS message and message data to be sent in association with the RTS message, to a destination compute node such that the RTS descriptor indicates to the destination compute node that the message data will be adaptively routed to the destination node. Using one DMA FIFO at the source compute node, the RTS descriptors are maintained for rendezvous messages destined for the destination compute node to ensure proper message data ordering thereat. Using a reception counter at a DMA engine, the destination compute node tracks reception of the RTS and associated message data and sends a clear to send (CTS) message to the source node in a rendezvous protocol form of a remote get to accept the RTS message and message data and processing the remote get (CTS) by the source compute node DMA engine to provide the message data to be sent.

24 Claims, 4 Drawing Sheets

U.S. PATENT DOCUMENTS

| | | | |
|---|---|---|---|
| 5,452,432 A | 9/1995 | Macachor |
| 5,524,220 A | 6/1996 | Verma et al. |
| 5,634,007 A | 5/1997 | Calta et al. |
| 5,659,710 A | 8/1997 | Sherman et al. |
| 5,708,779 A | 1/1998 | Graziano et al. |
| 5,761,464 A | 6/1998 | Hopkins |
| 5,796,735 A | 8/1998 | Miller et al. |
| 5,809,278 A | 9/1998 | Watanabe et al. |
| 5,825,748 A | 10/1998 | Barleu et al. |
| 5,890,211 A | 3/1999 | Sokolov et al. |
| 5,917,828 A | 6/1999 | Thompson |
| 6,023,732 A | 2/2000 | Moh et al. |
| 6,061,511 A | 5/2000 | Marantz et al. |
| 6,072,781 A | 6/2000 | Feeney et al. |
| 6,122,715 A | 9/2000 | Palanca et al. |
| 6,185,214 B1 | 2/2001 | Schwartz et al. |
| 6,219,300 B1 | 4/2001 | Tamaki |
| 6,263,397 B1 | 7/2001 | Wu et al. |
| 6,295,571 B1 | 9/2001 | Scardamalia et al. |
| 6,311,249 B1 | 10/2001 | Min et al. |
| 6,324,495 B1 | 11/2001 | Steinman |
| 6,356,106 B1 | 3/2002 | Greeff et al. |
| 6,366,984 B1 | 4/2002 | Carmean et al. |
| 6,442,162 B1 | 8/2002 | O'Neill et al. |
| 6,466,227 B1 | 10/2002 | Pfister et al. |
| 6,564,331 B1 | 5/2003 | Joshi |
| 6,594,234 B1 | 7/2003 | Chard et al. |
| 6,598,123 B1 | 7/2003 | Anderson et al. |
| 6,601,144 B1 | 7/2003 | Arimilli et al. |
| 6,631,447 B1 | 10/2003 | Morioka et al. |
| 6,647,428 B1 | 11/2003 | Bannai et al. |
| 6,662,305 B1 | 12/2003 | Salmon et al. |
| 6,735,174 B1 | 5/2004 | Hefty et al. |
| 6,775,693 B1 | 8/2004 | Adams |
| 6,799,232 B1 | 9/2004 | Wang |
| 6,880,028 B2 | 4/2005 | Kurth |
| 6,889,266 B1 | 5/2005 | Stadler |
| 6,894,978 B1 | 5/2005 | Hashimoto |
| 6,954,887 B2 | 10/2005 | Wang et al. |
| 6,986,026 B2 | 1/2006 | Roth et al. |
| 7,007,123 B2 | 2/2006 | Golla et al. |
| 7,058,826 B2 | 6/2006 | Fung |
| 7,065,594 B2 | 6/2006 | Ripy et al. |
| 7,143,219 B1 | 11/2006 | Chaudhari et al. |
| 7,191,373 B2 | 3/2007 | Wang et al. |
| 7,239,565 B2 | 7/2007 | Liu |
| 7,280,477 B2 | 10/2007 | Jeffries et al. |
| 7,298,746 B1 | 11/2007 | De La Iglesia et al. |
| 7,363,629 B2 | 4/2008 | Springer et al. |
| 7,373,420 B1 | 5/2008 | Lyon |
| 7,401,245 B2 | 7/2008 | Fischer et al. |
| 7,454,640 B1 | 11/2008 | Wong |
| 7,454,641 B2 | 11/2008 | Connor et al. |
| 7,461,236 B1 | 12/2008 | Wentzlaff |
| 7,463,529 B2 | 12/2008 | Matsubara |
| 7,539,845 B1 | 5/2009 | Wentzlaff et al. |
| 7,613,971 B2 | 11/2009 | Asaka |
| 7,620,791 B1 | 11/2009 | Wentzlaff et al. |
| 7,698,581 B2 | 4/2010 | Oh |
| 2001/0055323 A1 | 12/2001 | Rowett et al. |
| 2002/0078420 A1 | 6/2002 | Roth et al. |
| 2002/0087801 A1 | 7/2002 | Bogin et al. |
| 2002/0100020 A1 | 7/2002 | Hunter et al. |
| 2002/0129086 A1 | 9/2002 | Garcia-Luna-Aceves et al. |
| 2002/0138801 A1 | 9/2002 | Wang et al. |
| 2002/0156979 A1 | 10/2002 | Rodriguez |
| 2002/0184159 A1 | 12/2002 | Tadayon et al. |
| 2003/0007457 A1 | 1/2003 | Farrell et al. |
| 2003/0028749 A1 | 2/2003 | Ishikawa et al. |
| 2003/0050714 A1 | 3/2003 | Tymchenko |
| 2003/0050954 A1 | 3/2003 | Tayyar et al. |
| 2003/0074616 A1 | 4/2003 | Dorsey |
| 2003/0105799 A1 | 6/2003 | Khan et al. |
| 2003/0163649 A1 | 8/2003 | Kapur et al. |
| 2003/0177335 A1 | 9/2003 | Luick |
| 2003/0188053 A1 | 10/2003 | Tsai |
| 2003/0235202 A1 | 12/2003 | Van Der Zee et al. |
| 2004/0003184 A1 | 1/2004 | Safranek et al. |
| 2004/0019730 A1 | 1/2004 | Walker et al. |
| 2004/0024925 A1 | 2/2004 | Cypher et al. |
| 2004/0073780 A1 | 4/2004 | Roth et al. |
| 2004/0103218 A1 | 5/2004 | Blumrich et al. |
| 2004/0210694 A1 | 10/2004 | Shenderovich |
| 2004/0243739 A1 | 12/2004 | Spencer |
| 2005/0007986 A1 | 1/2005 | Malladi et al. |
| 2005/0053057 A1 | 3/2005 | Deneroff et al. |
| 2005/0076163 A1 | 4/2005 | Malalur |
| 2005/0160238 A1 | 7/2005 | Steely et al. |
| 2005/0216613 A1 | 9/2005 | Ganapathy et al. |
| 2005/0251613 A1 | 11/2005 | Kissell |
| 2005/0270886 A1 | 12/2005 | Takashima |
| 2005/0273564 A1 | 12/2005 | Lakshmanamurthy et al. |
| 2006/0050737 A1 | 3/2006 | Hsu |
| 2006/0080513 A1 | 4/2006 | Beukema et al. |
| 2006/0206635 A1 | 9/2006 | Alexander et al. |
| 2006/0248367 A1 | 11/2006 | Fischer et al. |
| 2007/0055832 A1 | 3/2007 | Beat |
| 2007/0133536 A1 | 6/2007 | Kim et al. |
| 2007/0168803 A1 | 7/2007 | Wang et al. |
| 2007/0174529 A1 | 7/2007 | Rodriguez et al. |
| 2007/0195774 A1 | 8/2007 | Sherman et al. |
| 2008/0040715 A1* | 2/2008 | Cota-Robles et al. ............ 718/1 |
| 2008/0147987 A1 | 6/2008 | Cantin et al. |

OTHER PUBLICATIONS

Almasi, et al., "MPI on BlueGene/L: Designing an Efficient General Purpose Messaging Solution for a Large Cellular System," IBM Research Report RC22851 (W037-150) Jul. 22, 2003.

Almasi, et al.,"Optimization of MPI Collective Communication on BlueGene/L Systems," ICS'05, Jun. 20-22, 2005, Boston, MA.

Gara, et al., "Overview of the Blue Gene/L system architecture," IBM J. Res. & Dev., vol. 49, No. 2/3, Mar./May 2005, pp. 195-212.

Huang, et al., "Performance Evaluation of Adaptive MPI," PPoPP'06, Mar. 29-31, 2006, New York, New York.

MPI (Message Passing Interface) standards documents, errata, and archives http://www.mpi-forum.org visited Jun. 16, 2007 (Sections 4.2, 4.4 and 10.4).

David Chaiken, Craig Fields, Kiyoshi Kurihara, Anant Agarwal, Directory-Based Cache Coherence in Large-Scale Multiprocessors, Computer, v.23 n. 6, p. 49-58, Jun. 1990.

Michel, Dubois, Christoph Scheurich, Faye A. Briggs, Synchronization, Coherence, and Event Ordering in Multiprocessors, Computer, v.21 n. 2, p. 9-21, Feb. 1988.

Giampapa, et al., "Blue Gene/L advanced diagnostics environment," IBM J. Res. & Dev., vol. 49, No. 2/3, Mar./May 2005, pp. 319-331.

IBM Journal of Research and Development, Special Double Issue on Blue Gene, vol. 49, Nos. 2/3, Mar./May 2005 ("Preface").

IBM Journal of Research and Development, Special Double Issue on Blue Gene, vol. 49, Nos. 2/3, Mar./May 2005 ("Intro").

"Intel 870: A Building Block for Cost-Effective, Scalable Servers", Faye Briggs, Michel et al., pp. 36-47, Mar.-Apr. 2002.

Pande, et al., Performance Evaluation and Design Trade-Offs for Network-On-Chip Interconnect Architectures, 2005, IEEE, pp. 1025-1040.

* cited by examiner

MESSAGE PASSING WITH A LIMITED NUMBER OF DMA BYTE COUNTERS

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract. No. B554331 awarded by the Department of Energy.

CROSS-REFERENCE TO RELATED APPLICATIONS

The present invention is related to the following commonly-owned, United States Patent Applications and issued U.S. Patents filed on even date herewith, the entire contents and disclosure of each of which is expressly incorporated by reference herein as if fully set forth herein. U.S. patent application Ser. No. 11/768,777, for "A SHARED PERFORMANCE MONITOR IN A MULTIPROCESSOR SYSTEM"; U.S. Pat. No. 7,886,084, for "OPTIMIZED COLLECTIVES USING A DMA ON A PARALLEL COMPUTER"; U.S. Pat. No. 7,694,035, for "DMA SHARED BYTE COUNTERS IN A PARALLEL COMPUTER"; U.S. Pat. No. 7,788,334, for "MULTIPLE NODE REMOTE MESSAGING"; U.S. patent application Ser. No. 11/768,697, for "A METHOD AND APPARATUS OF PREFETCHING STREAMS OF VARYING PREFETCH DEPTH"; U.S. Pat. No. 7,877,551, for "PROGRAMMABLE PARTITIONING FOR HIGH-PERFORMANCE COHERENCE DOMAINS IN A MULTIPROCESSOR SYSTEM"; U.S. Pat. No. 7,827,391, for "METHOD AND APPARATUS FOR SINGLE-STEPPING COHERENCE EVENTS IN A MULTIPROCESSOR SYSTEM UNDER SOFTWARE CONTROL"; U.S. Pat. No. 7,669,012, for "INSERTION OF COHERENCE EVENTS INTO A MULTIPROCESSOR COHERENCE PROTOCOL"; U.S. patent application Ser. No. 11/768,791, for "METHOD AND APPARATUS TO DEBUG AN INTEGRATED CIRCUIT CHIP VIA SYNCHRONOUS CLOCK STOP AND SCAN"; U.S. Pat. No. 7,802,025, for "DMA ENGINE FOR REPEATING COMMUNICATION PATTERNS"; U.S. Pat. No. 7,680,971, for "METHOD AND APPARATUS FOR A CHOOSE-TWO MULTI-QUEUE ARBITER"; U.S. patent application Ser. No. 11/768,800, for "METHOD AND APPARATUS FOR EFFICIENTLY TRACKING QUEUE ENTRIES RELATIVE TO A TIMESTAMP"; U.S. Pat. No. 7,701,846, for "BAD DATA PACKET CAPTURE DEVICE"; U.S. patent application Ser. No. 11/768,593, for "EXTENDED WRITE COMBINING USING A WRITE CONTINUATION HINT FLAG"; U.S. Pat. No. 7,793,038, for "A SYSTEM AND METHOD FOR PROGRAMMABLE BANK SELECTION FOR BANKED MEMORY SUBSYSTEMS"; U.S. Pat. No. 7,761,687, for "AN ULTRASCALABLE PETAFLOP PARALLEL SUPERCOMPUTER"; U.S. patent application Ser. No. 11/768,810, for "SDRAM DDR DATA EYE MONITOR METHOD AND APPARATUS"; U.S. Pat. No. 7,797,503, for "A CONFIGURABLE MEMORY SYSTEM AND METHOD FOR PROVIDING ATOMIC COUNTING OPERATIONS IN A MEMORY DEVICE"; U.S. patent application Ser. No. 11/768,559, for "ERROR CORRECTING CODE WITH CHIP KILL CAPABILITY AND POWER SAVING ENHANCEMENT"; U.S. Pat. No. 7,873,843, for "STATIC POWER REDUCTION FOR MIDPOINT-TERMINATED BUSSES"; U.S. patent application Ser. No. 11/768,527, for "COMBINED GROUP ECC PROTECTION AND SUBGROUP PARITY PROTECTION"; U.S. patent application Ser. No. 11/768,669, for "A MECHANISM TO SUPPORT GENERIC COLLECTIVE COMMUNICATION ACROSS A VARIETY OF PROGRAMMING MODELS"; U.S. Pat. No. 7,738,443, for "ASYNCRONOUS BROADCAST FOR ORDERED DELIVERY BETWEEN COMPUTE NODES IN A PARALLEL COMPUTING SYSTEM WHERE PACKET HEADER SPACE IS LIMITED"; U.S. patent application Ser. No. 11/768,682, for "HARDWARE PACKET PACING USING A DMA IN A PARALLEL COMPUTER"; and U.S. patent application Ser. No. 11/768,752, for "POWER THROTTLING OF COLLECTIONS OF COMPUTING ELEMENTS".

BACKGROUND OF THE INVENTION

The invention relates broadly to message passing in parallel computer systems using direct memory access (DMA) engines, and more particularly relates to a DMA engine for implementing a rendezvous protocol through use of a limited number of DMA reception and injection byte counters to support a large number of outstanding messages by sharing, a method for message passing in a parallel computer system including DMAs at local compute nodes comprising the system constructed with a limited number of injection and reception byte counters, and parallel computer system including such DMAs or DMA engine.

Parallel computer systems include multiple processors, or multiple compute nodes comprising processors, which run threads or local instances of global applications to accomplish tasks or processes, e.g., BlueGene/P ultrascalable Petaflop Parallel Supercomputer, by IBM Corporation. The local application or thread carries out the message passing to complete designated, node-specific portions of the task or process. At the compute nodes, "events" are generated each time a message is received, and are processed according to compute node's inherent event processing algorithm. To ensure proper communication between various compute nodes comprising a parallel computer system, a standard known as message passing interface (MPI) has developed. MPI is the industry-standard message passing interface.

An MPI program consists of autonomous processes, executing their own code, which need not be identical. Typically, each process or application communicates via calls to MPI communication primitives, where each process executes in its own and shared memory. Such message passing allows the local processors comprising the compute node, and applications running thereon (a thread or instance of the global application or process) to cooperate with each other. Generally speaking, an MPI is an interface designed to allow a user to code data such that the local processors at the compute nodes comprising the network are able to send and receive data and information to coordinate the disposition of the global application or process. MPI is available on a wide variety of platforms ranging from massively parallel systems (IBM, Cray, Intel Paragon, etc.) to networks of workstations.

The use of Direct Memory Address (DMA) technology provides for reducing CPU (processor) workload in the management of memory operations required for messaging in any computer system, and are particularly relied on in large parallel computer systems. DMA, or DMA engines, work in conjunction with the local application or thread implementing the MPI application. Workload that would normally have to be processed by a CPU at a compute node is instead handled by the DMA engine. The use of DMA technology in large parallel computer systems is limited somewhat by such system's inherent the need for tight hardware control and coordination of memory and message-passing operations. That is, required tight coupling between memory operations and CPU operations poses some challenges, including the need for a sending side compute node (a source compute node originating a message to be passed to another or multiple other compute nodes) to have awareness of the receiver node's remote address spaces, multiple protection domains, locked down memory requirements (also called pinning), notification, striping, recovery models, etc.

In parallel computer, such as the BlueGene/P, a "Rendezvous" protocol is often used to send long messages between compute nodes. Following the Rendezvous protocol, a source compute node (a thread or instance of the global application running on the sending side) sends a long message by first passing a request to send (RTS) packet to the target compute node. The RTS contains information or data identifying the source compute node and the message being. sent, e.g., number of total bytes. The target compute node replies to the RTS by generating and sending a "CTS (clear to send)" packet, assuming the target compute node is able to receive. The CTS includes information or data describing the target compute node (destination side) in order to receive the entire message. Finally, the source compute node sends self-describing "data" packets to the Target node, which can arrive in any order. The packet transfer continues until the entire message has been sent. RTS packet transfers, or message transfers following the Rendezvous protocol, are ordered with respect to the transfer of other messages out of a compute node, or into a compute node, e.g., with respect to other rendezvous or eager messages.

As mentioned above, computer systems and in particular parallel computer systems such as BlueGene/P utilize DMA engines to asynchronously move data (e.g., message passing) between in-node memory and the communications network (other compute nodes). DMA engines operate under a set of constructs used by message passing libraries (as in MPI) to set up and monitor completion of DMA data transfers. In large parallel computer systems such as BlueGene/P, DMAs may be fabricated within or integrated into the same ASIC comprising the node's processors. As such, size is a consideration and therefore such DMAs often have finite resources, for example, byte counters to tracks the number of bytes sent or received in a DMA transfer, which must be managed wisely to maximize the exchange of the many messages (at the compute node comprising the DMA channel). In peak performance applications, many messages might be regularly outstanding that must be managed by the DMA engine before data transfers.

Message passing libraries used for DMA message transfer in parallel computer systems inefficiently implement known rendezvous protocol for some applications. Before the instant invention, it has been unknown for conventional parallel computer systems to operate with DMA engines that have inherently limited numbers of byte counters and other registers because of size constraints. Until the recent development of IBM's BlueGene/P ultrascalable Petaflop Parallel Supercomputer, which includes compute nodes with DMA engines integrated within a single ASIC core (and therefore a limited number of byte counters), efficiency utilizing such a limited number of byte counters was not a priority for computer designers. Hence, other versions of the rendezvous protocol to provide for a DMA engine's efficient management of a limited number of counters are unknown, and would be desirable for use in a supercomputer such as BlueGene/P.

What would be desirable in the field of parallel computer systems and their design, and in particular in parallel computer systems including DMA engines constructed to operate with limited byte counter resources, is a DMA engine capable of supporting a large number of outstanding messages and detection of message completion in a parallel multi-computer system in which there is a DMA engine.

SUMMARY OF THE INVENTION

To that end, the present invention provides a parallel computer system interconnected by a plurality of separate compute nodes, where each compute node comprises local processors and a DMA engine on a single chip or ASIC such that the DMA has limited byte counter resources, where the DMA engine includes byte counter sharing between multiple messages, and an ability to check and determine when a message (required data transfer) is complete, particularly in the case where other messages sharing the byte counter have not been completed for efficient message passing.

A method for passing messages in a parallel computer system constructed as a plurality of compute nodes interconnected as a network where each compute node includes a DMA engine but includes only a limited number of byte counters for tracking a number of bytes that are sent or received by the DMA engine, where the byte counters may be used in shared counter or exclusive counter modes of operation. The method includes using rendezvous protocol, a source compute node deterministically sending a request to send (RTS) message with a single RTS descriptor using an exclusive injection counter to track both the RTS message and message data to be sent in association with the RTS message, to a destination compute node such that the RTS descriptor indicates to the destination compute node that the message data will be adaptively routed to the destination node. Using one DMA FIFO at the source compute node, the RTS descriptors are maintained for rendezvous messages destined for the destination compute node to ensure proper message data ordering thereat Using a reception counter at a DMA engine, the destination compute node tracks reception of the RTS and associated message data and sends a clear to send (CTS) message to the source node in a rendezvous protocol form of a remote get to accept the RTS message and message data and processing the remote get (CTS) by the source compute node DMA engine to provide the message data to be sent. The message is complete when the injection counter at said first compute node counts down to zero (0), and wherein the receive is complete when the reception counter at said destination compute node counts down to zero (0).

A parallel computer system comprising a plurality of interconnected compute nodes that includes message passing between said interconnected compute nodes, wherein each compute node comprises at least one processor, a memory and a DMA engine with counters that may be used either as shared or exclusive injection counters, and wherein the shared injection counters track the progress of many messages, while the exclusive injection counters track the progress of only one message. To send a message, a source compute node sends an RTS message including at least one message descriptor, and its exclusive injection counter tracks both the RTS message sent and message data sent. The RTS message is sent deterministically and the message data are sent adaptively. The RTS's at least one message descriptor indicates to the DMA engine that the RTS message must be sent deterministically. The DMA engine at a destination compute node, upon receipt of the message sent, uses a reception counter to track progress of the message data. The DMA engine sends a remote get message to the source compute node in a form of a CTS message. The RTS includes a source buffer, message size, a metadata tag and a communicator. A destination node receives the message using a shared overflow receetion counter in its DMA engine. A remote get may be replaced by a memory FIFO send and a direct put by a processor at the destination mode. Acknowledgments may be replaced by direct puts instead of memory FIFO packets.

BRIEF DESCRIPTION OF THE DRAWING FIGURES

The objects, features and advantages of the present invention will become apparent to one skilled in the art, in view of the following detailed description taken in combination with the attached drawings, in which.

Figure 4:
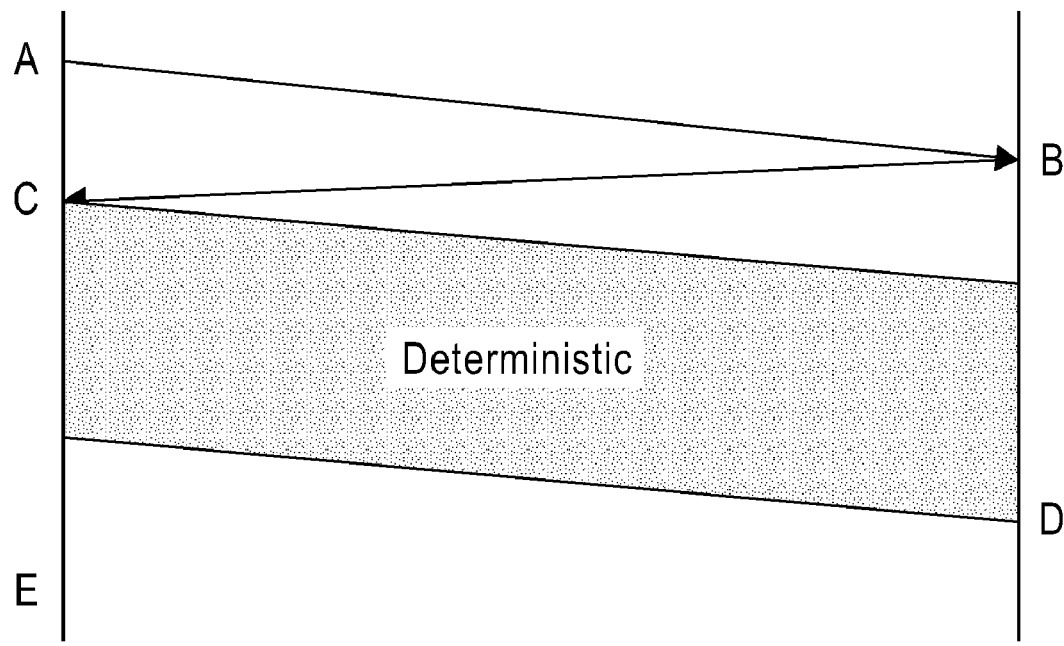
Figure 5:
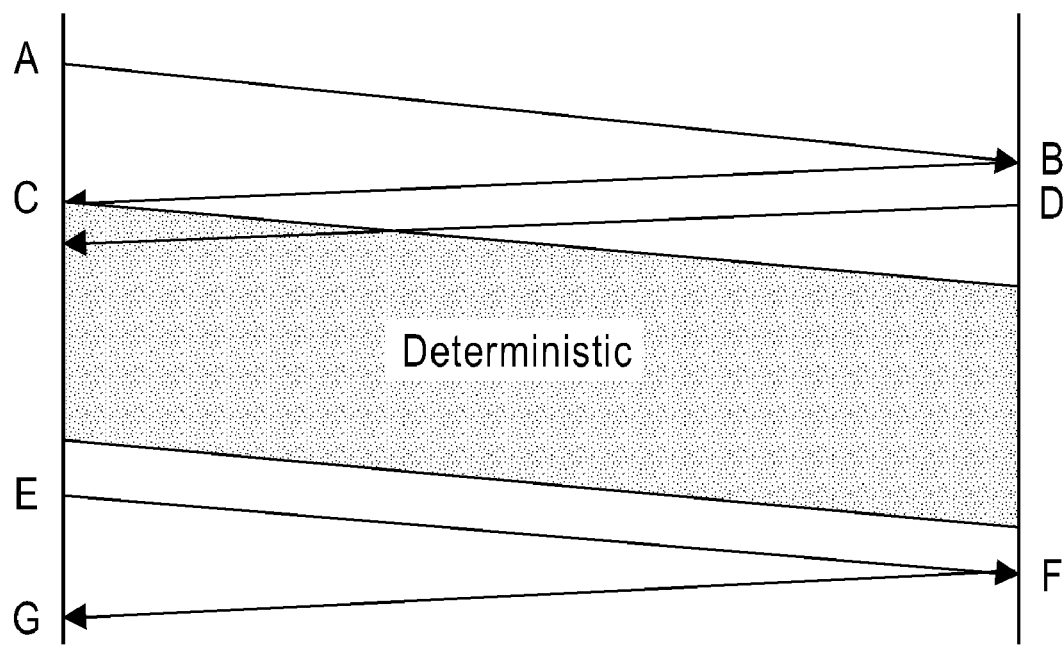
Figure 6:
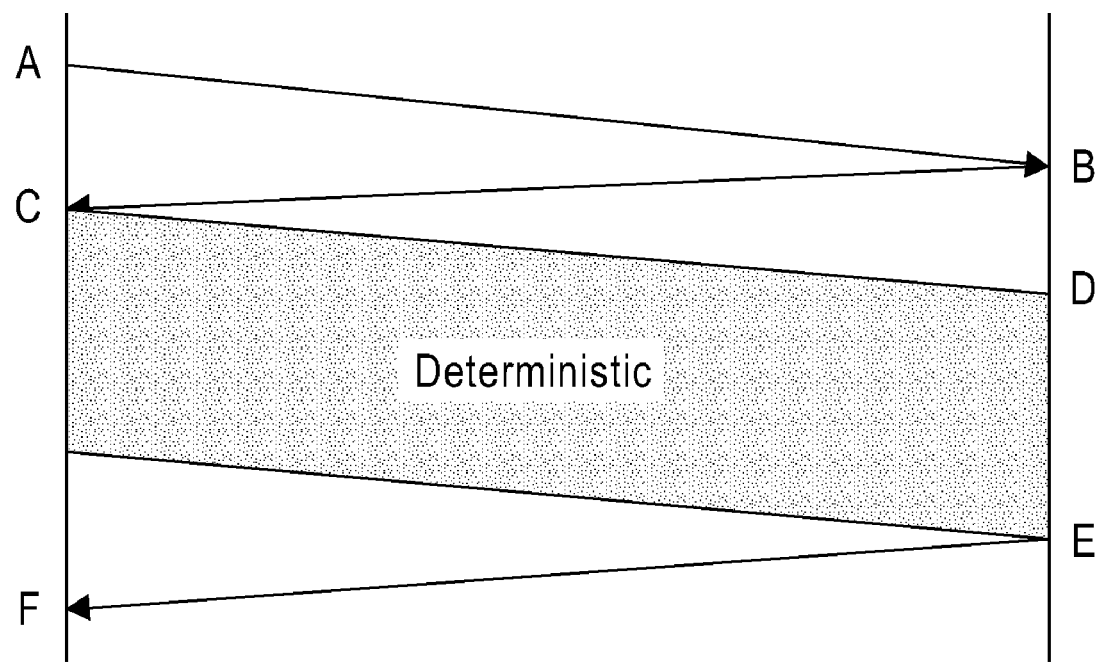
Figure 7:
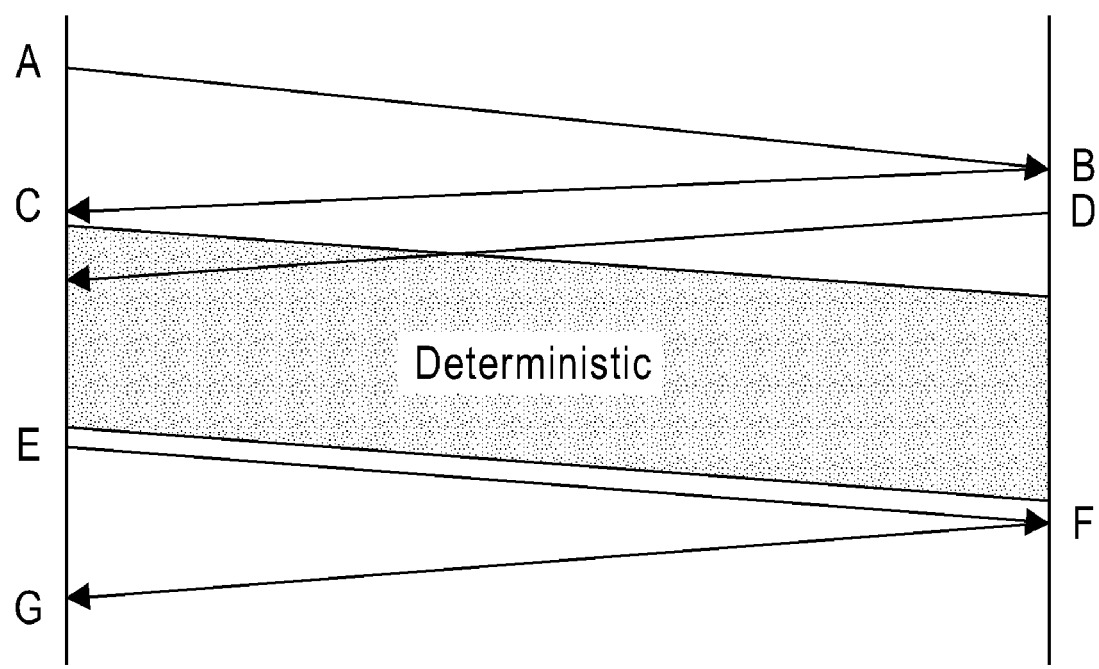

FIGS. 4 and 5 are flow diagrams of handshaking steps implemented in first and second cases of a third scheme or method for message passing of the invention, highlighting rendezvous with shared injection byte counters and exclusive reception byte counters in the case where the target or receiver compute node is out of exclusive counters, but exclusive counters are available at the target compute node; and FIGS. 6 and 7 are flow diagrams of handshaking steps implemented in first and second cases of a fourth scheme or method for message passing of the invention, highlighting rendezvous with shared injection byte counters and exclusive reception byte counters in the case where the target or receiver, and the source or sender compute node are both out of exclusive counters, using the shared counter optimizations as shown in FIGS. 4 and 5, including that an acknowledge is sent back from the target compute node to the source compute node, or the source compute node to the target compute node, as the case maybe, as either used the shared reception or injection shared byte counter.

DETAILED DESCRIPTION OF THE INVENTION

The parallel computer system with DMA shared injection and reception byte counters, and the novel messaging methods of message passing operation enabled and provided thereby are set forth and described herein for the purpose of conveying the broad inventive concepts. The drawings and descriptions provided are not meant to limit the scope and spirit of the invention in any way.

The shared injection and reception byte counters, DMA engine constructed to use the shared byte counters, method of message passing using the DMA engine with shared byte counters are constructed for use in a distributed memory, parallel computer system comprising a plurality of compute nodes interconnected as a network, such as IBM, Inc.'s ultrascalable petaflop parallel supercomputer, as described in commonly-owned, pending U.S. Pat. No. 7,761, 687, filed concurrently herewith and entitled: ULTRASCALABLE PETAFLOP PARALLEL SUPERCOMPUTER, incorporated by reference herein. The novel ultrascalable petaflop parallel supercomputer may achieve 1 or multi petaflops, with up to 458,752 cores, or 114,688 nodes. BlueGene/P is based upon System-On-a-Chip technology, where each processing node comprises a single Application Specific Integrated Circuit (ASIC).

The ASIC nodes comprising BlueGene/P parallel computer systems are interconnected by multiple independent networks that optimally maximize packet communications throughput the system with minimal latency. The multiple networks may include three high-speed networks for parallel algorithm message passing, including a Torus with direct memory access (DMA), collective network, and a Global Asynchronous network that provides global barrier and notification functions. These multiple independent networks may be collaboratively or independently utilized according to the needs or phases of an algorithm (or running application) for optimizing algorithm-processing performance.

At least four modes of operation are supported: virtual mode, SMP 1-core mode, SMP 4-core mode and dual mode. In the virtual node mode, each of the processing cores will perform its own MPI (message passing interface) task independently. Each core uses a quarter of the memory (L3 and DRAM) of the node, while coherence among the four MPI within the node and across the nodes is maintained by MPI. In the SMP (Symmetric Multi Processor) 1-core mode, one core performs a single MPI task, using the entire memory capacity of the node. In the SMP 4-core mode, one MPI task with 4 threads is running, using the whole node memory capacity. The fourth mode called the dual mode. In this hybrid case, two SMP MPI tasks are running, with each SMP using 2 cores running a thread each. Finally, one can also support modes such as a 1, 3 split, and 1, or 2 or 3 cores idling. Thus a node can trade off amount of memory versus parallelism, a feature unique to this supercomputer.

The novel ultrascalable petaflop parallel supercomputer architecture allows the multiple networks to be utilized simultaneously, independently, or in collaboration. Because of the system-on-a-chip level integration, in collaboration with operating system software designed to take advantage of this architecture, alternating between such modes of operation can occur with minimal overheads. In cases where the computation is awaiting message arrival, this may happen automatically.

To connect nodes, multiple network paradigms are implemented to interconnect nodes for use individually or simultaneously, and include three high-speed torus networks for parallel algorithm message passing. Additional networks are provided for external connectivity and are used for Input/Output, System Management and Configuration, and Debug and Monitoring services for the compute nodes. The high-speed networks preferably include n-dimensional Torus, collective network, and Global Signal configurations. The use of each of these networks may switch back and forth based on algorithmic needs or phases of algorithms. For example, parts of calculations may be performed with the Torus, or part on the collective network, which facilitates the development of new parallel algorithms that simultaneously employ multiple networks in novel ways.

Each compute node comprises a single ASIC and a plurality of SDRAM-DDR2 memory chips. The compute nodes are interconnected through at least six (6) links, the highest aggregate bandwidth of which is a nearest neighbor link that maps the nodes into a physical 3-dimensional torus. The interconnect structure comprises a torus with preferably no asymmetries as the compute nodes communicate with the same bandwidth and nearly the same latency to compute nodes that are physically close as to those compute nodes that are physically located on neighboring racks. Such interconnect structure facilitates simpler programming models. The ASICs that power the compute nodes are based on system-on-a-chip (s-o-c) technology and incorporate all of the functionality needed by the system. The ASICs or compute nodes include 8 MB or more of extremely high bandwidth embedded DRAM. The compute nodes are physically small, allowing for a very high density of processing and optimizing cost/performance.

Because of the torus's DMA feature, internode communications can overlap with computations running concurrently on the nodes. Also complex forms of messaging protocols, particular arithmetic functions, often called "reduction functions", are required to be invoked on message data as it arrives. One compute node core may be implemented to perform these functions without distracting computations on other cores. Additionally, because of the computational power of the I/O processor, the application is able to define arbitrarily complex reduction functions, supporting new algorithmic development that overlaps computational power with communication activities. For particular classes of parallel algorithms, or parts of parallel calculations, this architecture may apply the power of some or all cores to work in collaboration on communication activities.

In a preferred embodiment of the parallel computer system, the system packaging comprises 512 processing compute nodes (as distinguished from I/O nodes) on a doubled-sided board or "midplane". Each processing or compute node contains 4 processor cores for handling computation and message passing operations. In addition, associated with a prescribed plurality of processing nodes is a dedicated I/O node that comprises a quad-processor with external memory, for handling of I/O communications to and from the compute nodes. Each I/O compute node has an operating system (Linux based) that can handle basic tasks and all the functions' necessary for high performance real time code. For compiling, diagnostics, and analysis, a host machine running a global application is required. The I/O compute nodes contain a software layer above the layer on the compute nodes for handling host communications. The choice of host compute node depends on the class of applications, their bandwidth needs and performance requirements.

Figure 1:
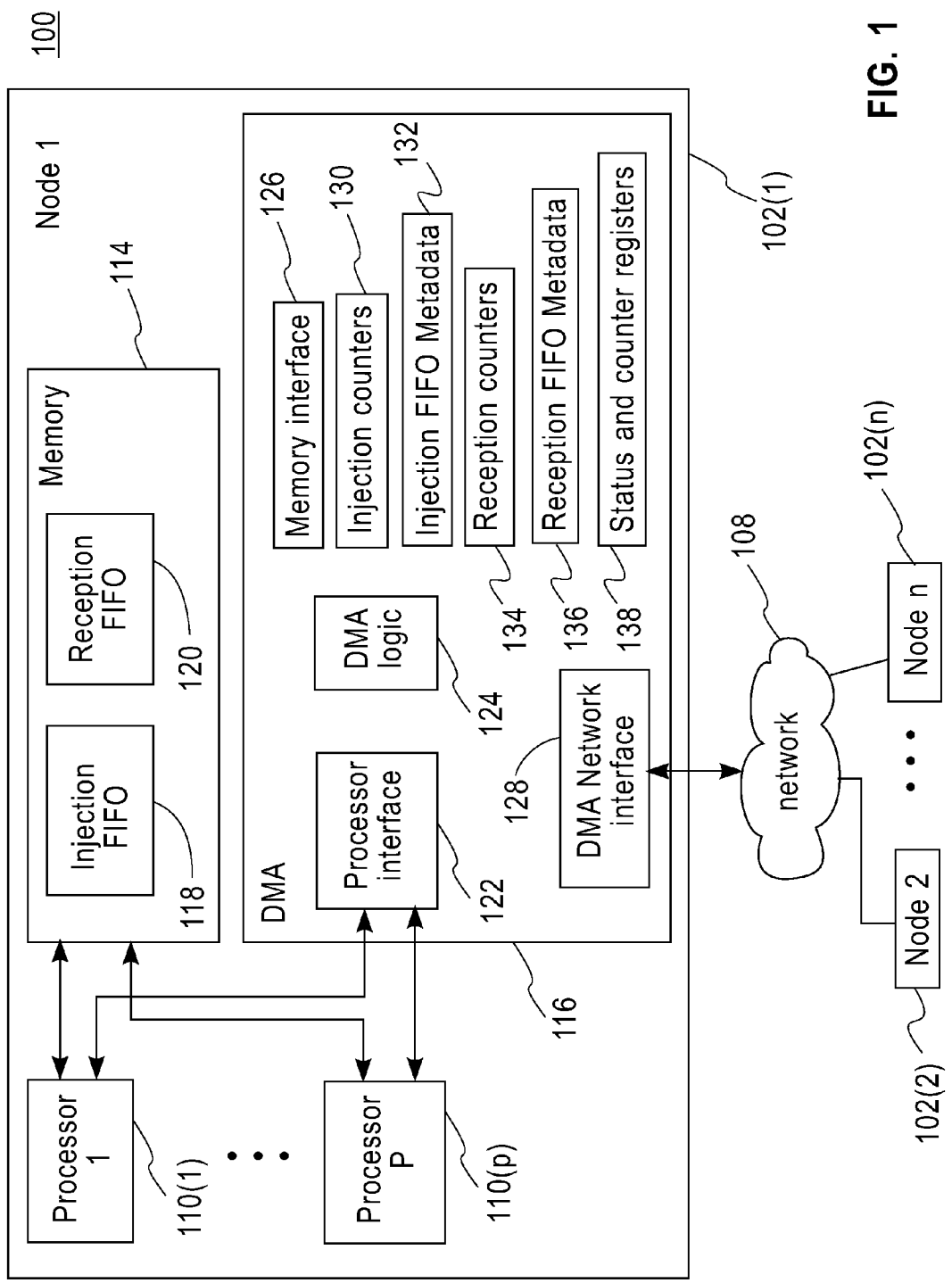
FIG. 1 is schematic diagram highlighting the functional structure of a parallel computer system of the invention, comprising multiple nodes connected together by a network.

FIG. 1 herein is a schematic block diagram illustrating one embodiment of an ultrascalable petaflop parallel supercomputer ("parallel computer system 100") of the invention that includes the novel DMA, and its novel message passing using a limited number of shared DMA injection and reception byte counters. Parallel computer system 100 comprises a plurality of individual compute nodes 102(1), 102(2) ... 102(n), which as mentioned are constructed as single ASICs and interconnected across network 108. FIG. 1 highlights a preferred construction of one of the compute nodes, ASIC 102(1), constructed in accordance with the principles of the invention. Each of compute nodes (102(n)) is fabricated to integrate all the functions of a computer into a single compute ASIC to enable a dramatic reduction in node size and power consumption. In a supercomputer, or parallel computer system, the reduced node size and its lower power consumption provides for increased node density thereby decreasing the overall cost/performance for the parallel computer system (100).

In more detail, compute node or ASIC 102(1) may function as both a compute node and an I/O node in the parallel computer system (100). Compute node 102(1) comprises a plurality of processors or processor cores, 110(1), ... 110(p), but preferably four (p=4). Each of the processor cores (110(p)) includes a "double" floating point unit that includes two coupled standard floating-point units. This arrangement gives a peak performance of four floating-point operations per processor core per clock cycle. Preferably, each processor core comprises a PowerPC450 embedded core available from IBM microelectronics. The skilled artisan should note that future versions of this core may be used as technology improves, without deviating from the scope and spirit of the invention. A description of the functionality of such a PowerPC450 core may be found at http://www.ibm.com/chips/power/powerpe/.

Besides the embedded processing cores 110(p), and floating point cores (not shown in FIG. 1), parallel computer system 100 includes a DMA 116 (constructed in accordance with the invention), and an embedded DRAM (memory 114). DRAM 114 includes injection 118 and reception FIFOs 120, and is controlled by an integrated external DDR2 memory controller (not shown in FIG. 1) and by DMA (116). DMA 116 consists of a processor interface 122, DMA logic 124, a memory interface 126, and a DMA Network Interface 128, injection counters 130, Injection FIFO Metadata 132, reception counters 134, reception FIFO data 136 and status and control registers 138. The Injection FIFO Metadata 132 describes where in memory (114) the Injection FIFOs 118 are located and the current head and tail of the FIFOs. The Reception FIFO data 136 describes where in memory the Reception FIFOs 120 are located and the current head and tail of the FIFOs.

DMA 114 directly controls transfer of long messages, which long messages are typically preceded by short protocol messages that are deposited into reception FIFOs on a receiving node (for example, compute node 102(2). Through these protocol messages, the sender compute node and receiver compute node agree on which injection counter (130) and reception counter (134) identifications to use, and what the base offsets are for the messages being processed. Long message transfer may be initiated by a core processor on the sending node by placing a "put" message descriptor into an injection FIFO 118 (in memory 114), writing the injection counter base and value via writes via the DMA (memory) interface 126, and appropriately modifying the Injection FIFO Metadata 132 for that message. This includes advancing a tail pointer indicating the "last" message descriptor via a "write" to the DMA processor interface 122. DMA logic 124 reads the Injection FIFO Metadata 132 and recognizes which FIFOs have messages to be sent.

The DMA logic causes the memory interface 126 to read the descriptor in the Injection FIFO 118. The put message descriptor includes the injection byte counter (130) and reception counter (134) ids to be used, the message length, the initial injection and reception offsets of the message, the destination node and other network routing information. The DMA 116 begins fetching the message and assembling it into packets to be "put" on to the network (108). Each packet contains an offset from the reception byte counter (134) where the data from this packet is to be stored, and a count of how many bytes in this packet should be written. Novel DMA 116 is responsible for updating this information correctly for each packet, and puts the packets into the DMA Network Interface 128 (when space is available), at which time the packet enters the network and is routed to the destination compute node (e.g., compute node (p)). Note that the destination node may be the same as the source node, in which case bytes are simply copied from one part of the nodes memory to another.

After DMA 116 puts the message in the DMA Network Interface 128, it decrements the specified injection counter 130 by the number of bytes in the packet. Upon reaching the destination, the packet is put into the DMA Network Interface at that compute node (e.g., 102(p ), and the node's local DMA "recognizes" that the packet is there. The receive compute node DMA reads the reception byte counter id, offset and count from the received packet, looks up the reception counter base address, writes the appropriate number of bytes starting at the base plus packet offset, and then decrements the counter value by the bytes.

If a remote get operation is used, instead of the processor on the sending node injecting a descriptor into its injection FIFO 118, the receiving node sends a short get message (which contains a put descriptor and an injection Fifo id) to the sender compute node (e.g., 102(p)), and the DMA logic at the sender compute node puts this descriptor into the specified injection FIFO, and advances that FIFO's data (specifically the tail pointer) appropriately. To share a byte counter, the base address of the shared counter must be set to a value smaller than the base address of any message to be using that counter. The initial value of the shared byte counter is set to zero. The initial offset in a message descriptor is the message's starting address minus this base offset. The particular processor increments the counter value by the current message length, and in accordance with the novel DMA and shared byte counter operation, said processor need only know the current message length, but not the lengths of the other messages using the shared byte counter, nor the number of bytes that have already been received. Furthermore, the same reception byte counter may be used by messages from different source nodes.

Network 108 provides all the network link cut-through routing buffers and routing control block that allow any two nodes to communicate with low latency. The four (or "p") processor cores embedded in ASIC (node 102(1)) as shown maybe utilized for message handling and computation operations. Virtual cut-through torus routing is supported in a hardware block, which is integrated into the compute nodes (102 (p)) to allow for the elimination of the network adapter, typically required in conventional parallel computer system operation. Preferably, a virtual channel routing network is supported with two (2) dynamic and two (2) deterministic channels.

The same compute node ASIC construction is used as an I/O node, which is associated with a subset of the compute nodes (e.g., 16, 32, 64, or 128 compute nodes), for handling fileserver communication and I/O operations. The only difference between an I/O compute node and a computation compute node is that an I/O node enables and uses an external network interface. While the compute nodes may have the integrated 10 Gb Ethernet (they share a common ASIC), for purposes of discussion, the 10 Gb Ethernet interface is enabled at the I/O nodes only. The 10 Gb Ethernet functional units (XEMAC, ToMAL) interfaces to an arbiter, which arbitrates inputs to L3 from torus DMA and from the 10 Gb Ethernet (108). This allows the processor within a node to set up a transfer and return to handling messages with very little overhead.

As indicated herein, it should be understood that the present invention could be realized in hardware, software, or a combination of hardware and software, such as in the ultrascalable petaflop parallel supercomputer described above. The invention, however, is not limited to applications therein, but may be implemented in any kind of parallel computer/server system(s)—or other parallel computer system adapted for carrying out message passing using the novel DMA, and shared byte counters described herein. A typical combination of hardware and software could be any general-purpose multiple parallel computer system, or network, operating with a computer program or application that, when loaded and executed, carries out the respective methods described herein.

Alternatively, a specific use parallel computer system, or linked computer network, containing specialized hardware for carrying out one or more of the functional tasks of the invention, i.e., the message passing using the shared DMA byte counters at compute nodes comprising the system could be utilized.

For that matter, the present invention can also be embodied in a computer program product, which comprises all the respective features enabling the implementation of the methods for utilizing the novel message passing using the shared DMA byte counters as described herein, for example, the exemplary methods depicted in figures herein, and which product—when loaded in the parallel computer system or network, is able to carry out these and related methods. Computer program, software program, program, or software, in the present context mean any expression, in any language, code or notation, of a set of instructions intended to cause a parallel computer network or system having an information processing capability to perform a particular function either directly or after either or both of the following: (a) conversion to another language, code or notation; and/or (b) reproduction in a different material form.

As mentioned, DMA engines such as DMA 116 shown in FIG. 1 include byte counters to that track the number of bytes being transferred by the DMA engine, and the completion of the transfers. DMA 116 includes injection FIFOs that contain units of work for the DMA to do, and descriptors to describe data being sent. Reception FIFOs are used to buffer incoming packets, and memory FIFOs are used to send messages that will placed as packets in a memory buffer on the destination. For that matter, this operation does not require any counters to be allocated at the receiver.

In a direct put, a local buffer is copied to a remote address using the DMA, requiring a reception counter to be allocated for the operation. In a remote get, the DMA engine at one compute node (source) requests data to be transferred to another compute (target or receiver) node. DMA 116 ensures that this increment operation is done atomically, so that immediately after the increment, the counter contains the sum of the number of bytes to be injected (received), minus the number of bytes already injected (received). Thus when the shared injection (reception) counter reaches zero, all bytes in all messages have been sent (received). If the initial value of the counter is not zero, but some arbitrary value C, then all messages are complete when the byte count reaches C. As mentioned above, the source and destination nodes may be the same, corresponding to an intra-node memory copy.

Figure 2:
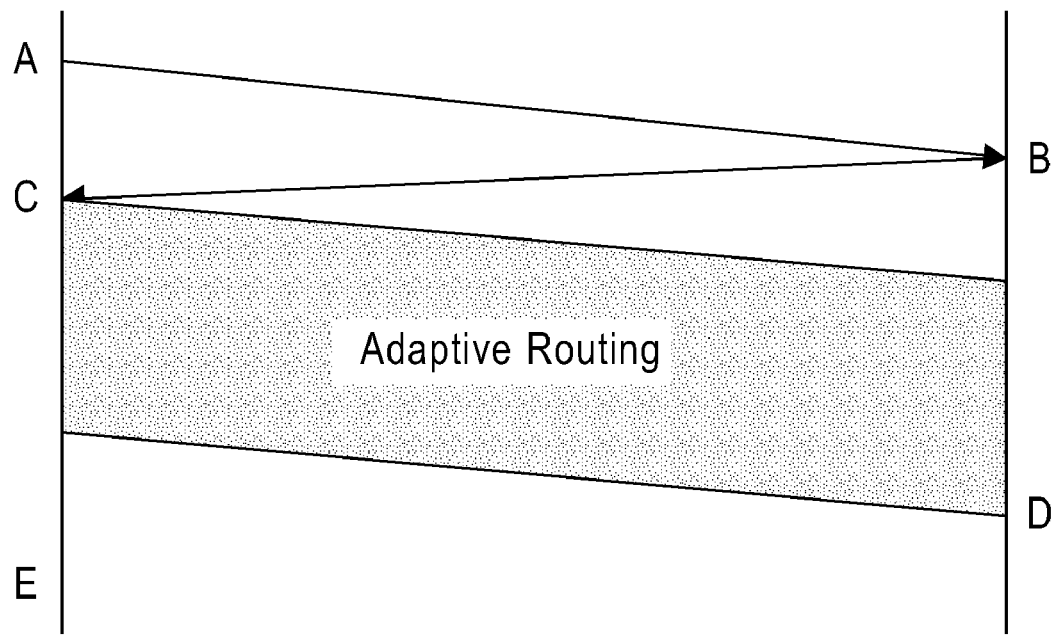
FIG. 2 is a flow diagram of handshaking steps implemented in a first scheme or method for message passing of the invention, highlighting injection or reception byte counter use as either shared or exclusive.

In a first embodiment or scheme, the invention comprises a simple rendezvous protocol transfer method or scheme that controls the MPI operating in the local application to perform the transfer at a compute node, as highlighted in handshaking steps of FIG. 2. Based on the novel scheme, an application running at a compute node manages the counters in such a way that a counter is either shared or exclusive. A shared counter tracks the progress of many messages. For example, a shared counter would only hit zero when all those messages have been sent. An exclusive counter is used to track the progress of only one message in the instant embodiment, but its operation includes tracking both the sending of the RTS (from the DMA at the source compute node) and the sending of the application's data. Only one descriptor is required for the RTS, which RTS descriptor indicates to the receiving DMA (at the target compute node) that it must be deterministically routed.

With MPI ordering the tags in the first packet of the message need to be matched in order. A standard reference on MPI should clearly state this. With deterministic routing all packets will be sent in order. With Rzv and adaptive routing only the RTS packets will be sent in order and the remote get could use adaptive routing with better network through put.

As used herein, the phrase deterministically routed means that the RTS descriptor will arrive at the target compute node in order relative to other messages, which require ordering with respect to each other. Furthermore, all packets in a deterministically routed message arrive at the destination in the same order in which they are sent. All RTS descriptors for rendezvous messages destined for the same target node are placed into the same DMA, as all other messages that require ordering with respect to each other. This ensures proper ordering among the messages and among packets of the same message. The reception counter tracks the reception of the application's data. For a remote get, a DMA "remote get" is is used for the CTS message. The remote get is received by the origin DMA, and does not require processing by the processor core at the origin compute node. Accordingly by such novel protocol and operation, the application can overlap computation (i.e., no need to interrupt the processors from their computational tasks).

The origin DMA processes the remote get by injecting a descriptor for the application's data. The remote get descriptor indicates to the origin DMA that the data packets can be dynamically routed, which may arrive out of order. Since the packets are self describing, the ordering is not important. Completion of the transfer at the origin compute node (sending DMA) occurs when the injection counter value hits zero. The application's data is processed by the target DMA, which does not require processing by the core, so the target application can overlap computation. Target completion occurs when the reception counter value hits zero.

One advantage of this simple rendezvous protocol transfer scheme is it's low overhead because there is only one handshake required between source and target nodes, and that it takes advantage of adaptive routing for good network throughput The simple rendezvous protocol transfer scheme, however, does not handle the case wherein the sender (source or origin) or receiver (target or receiving) has run out of counters (no counters instantly available). In consequence of such a counter shortage, the messages would therefore have to be queued up on the sender (source) side of the transfer, and receiver (target) side, which may also lead to trafficking deadlocks.

Returning to the FIG. 2 schematic diagram of the first method embodiment, element "A" therein indicates a step wherein a source or sender compute node sends an RTS using an exclusive injection counter. Element "B" indicates a step wherein the target or receiver node allocates an exclusive injection and reception byte counter, and posts a tremote get to receive the data. Element "C" indicates a step where, in response to the remote get, the sender DMA initiates the data transfer through a direct put. The figure further indicates that the data is sent using adaptive routing. Element "D" indicates the step where the exclusive injection counter at the sender node DMA has counted down to zero (0), and the sender node is notified of message completion. Element "E" indicates a step where the target or receive node's exclusive reception counter counts down to zero, and the receive node is notified that the message transfer is completed.

In a second embodiment or scheme, the invention comprises a simple resource management with shared counters scheme, wherein both the sender (source) or receiver (target) computes nodes have no available counters at a time in which several messages are being sent and received. This second scheme or embodiment efficiently transfers by reserving a shared injection counter that is then shared by all the remaining messages between the particular sender (source node) or the receiver (target node), the handshaking for which is highlighted in in FIG. 3. The remaining counters are referred to as exclusive counters that are not shared.

Figure 3:
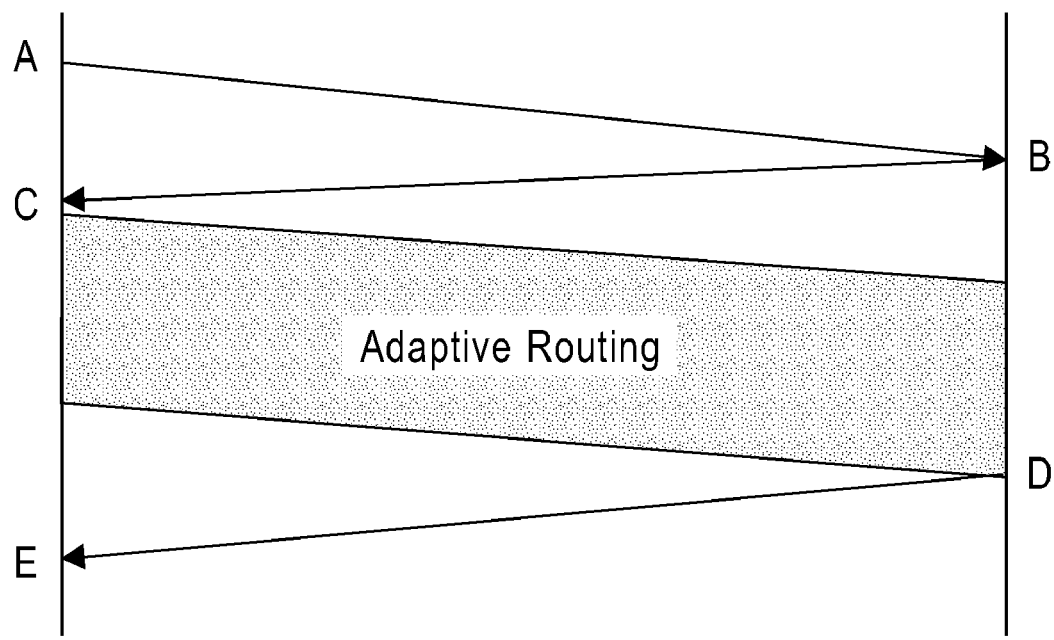
FIG. 3 is a flow diagram of handshaking steps implemented in a second scheme or method for message passing of the invention, highlighting rendezvous with shared injection byte counters and exclusive reception byte counters in a special case where a shared injection or reception byte counter is reserved in a case where there are no available counters.

More particularly with respect to FIG. 3 and the second scheme, a sender (source) has no available exclusive injection counters, but the receiving (target) side has an exclusive counter, the sender uses the receiver's exclusive counter as a shared counter to send the RTS with deterministic routing. The RTS includes the identification of the source buffer, the size of the message and the tag and communicator. The RTS also includes a sequence number of the message (or an address to do a direct put) to allow the receiver (target) to send an acknowledgement back to the sender (source). This acknowledgement may comprise a memory packet or a direct put to an network address.

The receiver (traget) matches the tags from a list of MPI posted and received with the tag in the RTS packet(s). The receiver then allocates an exclusive counter for the message and posts a remote get for min (rcvlen, sndlen) bytes. The remote get, and the "put" the remote get schedules both use adaptive routing. On message arrival (e.g., when reception exclusive counter hits zero), the receiver (target) sends an acknowledgement for the number of bytes received to the sender (source). This acknowledgement could be sent through a memory packet, or by a direct put operation, as described in the acknowledge descriptor in the RTS from the sender.

Returning to FIG. 3, element "A" indicates a step wherein a sender sends an RTS to a traget node using a shared injection counter. Element "B" indicates a step wherein the target or receive node allocates an exclusive reception counter and posts a remote get on a shared injection counter. Element "C" indicates a step where the source DMA initiates the data transfer using a direct put. The figure highlights that the data packets are transferred using adaptive routing. Element "D" indicates a step wherein the receiver sends and acknowledgement back to the source node using a shared byte counter. Element "E" indicates a step wherein the acknowledgment arrives at the source node, noting the source node of the completion of the message.

Such scheme provides that the sender can send an unlimited number of RTS messages without needing to queue up remote get messages until an exclusive reception counter becomes available. Like the scheme described with respect to FIG. 2, the FIG. 3 scheme uses adaptive routing for good network responsiveness. The reader should note, however, that the second scheme requiring that the acknowledgment being sent back from the receive compute node may incur some overhead expense.

In a third embodiment or scheme, the invention comprises a simple rendezvous protocol that uses exclusive injection counters and shared reception counters in two separate cases, as highlighted by the handshaking shown in FIGS. 4 and 5 herein. The sender compute node allocates an exclusive counter and sends an RTS packet with a source buffer address, and size of the message to be sent. The RTS packet includes information for an acknowledgement, such as described with respect to the second scheme (FIG. 3) to include a sequence number, or an address for a direct put. The sent RTS packet must also include the last byte of the message that is being sent. The receiver compute node uses a shared overflow reception counter (located therein), and posts a remote get using a shared injection counter.

The cases here are notifying receiver of completion by polling the last byte of the message or two descriptors in the remote get. The first one will send the data and the second one will send a memory fifo packet to the receiver which will fire a handler in the advance loop to notify completion.

Therein, the receiver sets the sndlen'th byte of the receive buffer to the its last-byte, and polls it for message completion. When the last byte (as included in the RTS) changes, the receiver (target node) can notify completion of the message. On the sender (source) side, the injection counter will hit zero. Element "A" indicates a step wherein a sender sends an RTS to a traget node using an exclusive injection counter, including the last byte of the message. Element "B" indicates a step wherein the target or receive node allocates a shared reception counter and posts a remote get on the shared injection counter. Element "C" indicates a step where the source DMA initiates the data transfer using a direct put. The figure highlights that the data packets are transferred using deterministic routing. Element "D" indicates a step wherein the source injection counter hts zero (0) and the sender or source compute node is notified of the completion. Element "E" indicates a step wherein the receive or target node polls the last byte of the message for completion.

The second case of the third embodiment (FIG. 5), the receiver (target) posts a remote get on a shared overflow reception counter, and a shared injection counter. The remote get's payload has two descriptors, a first descriptor for executing a direct-put from the sender to the receiver with the message payload, wherein the remote get packet could use adaptive routing, but that the direct put the remote get packet it schedules must use deterministic routing. The second descriptor can send a deterministic memory packet, wherein the deterministic memory packet will arrive after the put data has finished arriving, and can mark completion of the message on the receiver compute node. The message completes on the sender side when the exclusive counter hits zero. Alternatively, the second descriptor places a put back to a reserved memory location at the receiver which indicates completion.

The advance loop is called to poll the network for packets and events. On BGP the advance loop polls the reception memory fifo for packets and counter for hit zero events. In addition now we need to poll the last byte for completion). A put may be faster than a memory FIFO packet. But large number of outstanding receives may lead to an expensive advance poll. The poll may need a memory fence. In addition, an acknowledgement must be sent back to the sender from the target node notifying the sender node that only a part of the message was transferred. The acknowledgement information (the ack info may need an introduction) in the RTS from the sender is sent with this acknowledgement to allow the sender to know which message was acknowledged.

Returning to FIG. 5, element "A" indicates a step wherein a sender sends an RTS to a target node using an exclusive injection counter. Element "B" indicates a step wherein the target or receive node allocates a shared reception counter and posts a remote get on the shared injection counter, and posts a second remote get on a shared injection counter to be processed by the sener or source node DMA when the main data transfer is completed. Element "C" indicates a step where the source DMA initiates the data transfer using a direct put. The figure highlights that the data packets are transferred using deterministic routing. Element "D" indicates a step wherein the direct put from the second remote get tells the receiver that the message has arrived, and the target or receive compute node sends an acknowledgment back to the source node on a shared counter. Element "E" indicates a step wherein the source exclusive injection counter hts zero (0) and the sender or source compute node is notified of the completion. Element "F" indicates a step wherein the receive or target node sends and acknowledgement when it posts a remote get with a smaller send than the size of that allocated by the sender or source node injection counter. Element "G" indicates a step wherein, alternatively, arrival of the acknowledgment packet notifies the sender of completion.

In a fourth embodiment or scheme, the invention comprises a scheme including using a rendezvous protocol with shared injection counter and shared reception counters, as highlighted by the handshaking shown in the first and second cases for implementing the scheme of FIGS. 6 and 7, respectively. In the first case highlighted in FIG. 6, sndlen <=rcvlen. In the second case highlighted in FIG. 7, sndlen>rcvlen. In both cases, the sender and receiver have no exclusive counters available, and use the shared counter optimization that was described above with respect to both sender and receiver, so described in the third embodiment or scheme. In both cases, an acknowledge must to be sent back to the sender as it uses a shared counter.

The first case (FIG. 6) includes that the sender sends the RTS that uses a shared injection counter, where the RTS carries the last byte of the message. Receiver allocates a shared reception counter and posts a remote get on a shared injection counter. DMA initiates the data transfer through a direct put. Receiver polls the last byte of the message for completion. Receiver sends an ack back to the sender indicating message arrival. As shown in FIG. 6, element "A" indicates a step wherein a sender sends an RTS to a traget node using a shared injection counter, the RTS carrying the last byte of the message. Element "B" indicates a step wherein the target or receive node allocates a shared reception counter and posts a remote get on the shared injection counter. Element "C" indicates a step where the source DMA initiates the data transfer using a direct put. The figure highlights that the data packets are transferred using detrministic routing. Element "D" indicates a step wherein the receiver or target node polls the last byte of the message for completion. Element "E" indicates a step wherein the target or receive node sends an acknowledgment arrives back to the sender at the source node, notifying the source node of the message arrival (element or step "F").

The second case (FIG. 7) includes that the sender sends the RTS that uses a shared injection counter. The RTS has a descriptor for the ACK and the last byte of the message. Receiver allocates a shared reception counter and posts a remote get on a shared injection counter. DMA initiates the data transfer through a direct put. Receiver posts another remote get on a shared injection counter to be processed by the sender's dma when the main data transfer has finished. DMA initiates the the second direct put to follow the last packet. The direct put from the second remote get tells the receiver that the message has arrived. Receiver then sends an acknowledgement back to the sender on a shared counter. Arrival of ack packet notifies the sender of completion As shown in FIG. 7, element "A" indicates a step wherein a sender sends an RTS to a traget node using a shared injection counter, the RTS having a desriptor for the acknowledgment and the last byte of the message. Element "B" indicates a step wherein the target or receive node allocates a shared reception counter and posts a remote get on the shared injection counter. Element "C" indicates a step where the source DMA initiates the data transfer using a direct put. The figure highlights that the data packets are transferred using detistic routing. Element "D" indicates a step wherein the receiver or target node posts another remote get on a shared injection counter to be processed at the sender or source compute node's DMA when the main data transfer has finished. Element "E" indicates a step wherein the source or sender compute node DMA initiates a second direct put to follow the last packet. Element "F" indicates a step wherein the direct put from the second remote get informs the receive or target node that the message has arrived, whereafter the receive node sends an acknowledgment back to the sender on a shared counter. Element "G" indicates a step wherein arrival of the acknowledgment packet notifies the source node of the message completion.

A fifth scheme or embodiment may be the most complex of the above mentioned schemes. The fifth scheme effectively responds to those circumstances by which exclusive counters are unavailable on both the sender and the receiver sides of a transfer. The inventive redezvous protocol schemes 1-4 that were described above are premised on an assumption that the availability of counters is known before the message passing is initiated. In scheme 5, the invention anticipates and initiates send operations without knowledge of available counters but nevertheless uses the best of the schemes described, depending on the availability of counters on the sender and receiver.

The fifth scheme or embodiment can be implemented where the sender attempts to allocate an exclusive counter, and if successful, could thereafter utilize the first or third scheme described (FIGS. 2 and 4, 5). The RTS would then carry the source address of the message, the size of the message, the last byte of the message and an ack info (a message sequence number or a put address for the ack) to allow the receiver to acknowledge the message. But if the sender fails, it would send the RTS on a shared counter (schemes of FIGS. 3 and 6), again with the source address of the message, the size of the message, the last byte of the message, a flag indicating that RTS is on a shared counter and a sequence number to allow the receiver to acknowledge the message.

On receiving the RTS, the receiver would try to allocate an exclusive reception counter. If that succeeds it would use scheme 1 (FIG. 2) or scheme 2 (FIG. 3), depending on the shared counter flag in the RTS. If the exclusive allocation fails, the transfer would use schemes (3 or 4) depicted in FIGS. 4, 5 or 6, depending on the shared injection counter flag in the RTS.

In addition, a remote get can be replaced by a memory FIFO packet send and a direct put from the processor at the sender. The remote get would have been processed by the DMA at the destination. More, acknowledgements can be direct puts instead or memory packets. Direct puts may require more careful programming, but have lower overheads.

So far we have only considered the case when the sndlen (the length of the message the sender sends)=rcvlen (the size of the receive buffer posted by the application). The above cases can easily handle the scenario when sndlen<rcvlen where the remainder of ther receive buffer is unused. The remote gets are posted for size sndlen and the same completion notification mechanisms as when sndlen=rcvlen. However when sndlen>rcvlen, ie when the sender sends a larger message than than the receive buffer, we need to handle it carefully. In this case the remote get will result in a direct put of size rcvlen. The receiver will be notified in the same way as the schemes for sndlen=rcvlen. But, the sender would have to be notified by an acknowledgement where there already isn't one (Schemes 1 and 3).

While it is apparent that the invention herein disclosed is well calculated to fulfill the objects stated above, it will be appreciated that numerous modifications and embodiments may be devised by those skilled in the art and it is intended that the appended claims cover all such modifications and embodiments as fall within the true spirit and scope of the present invention. For that matter, the invention has been described herein with reference to particular exemplary embodiments. Certain alterations and modifications may be apparent to those skilled in the art, without departing from the scope of the invention. For instance, the task mapping algorithm may employ the communication cost metric as it running to determine if the result is expected to outperform the default mapping. The exemplary embodiments are meant to be illustrative, not limiting of the scope of the invention.

The invention claimed is:

1. A method for passing messages in a parallel computer system comprising a plurality of compute nodes interconnected as a network, where each compute node includes a DMA engine comprising a limited number of byte counters for tracking a number of bytes that are sent or received by the DMA engine, and where said byte counters may be used in shared counter or exclusive counter mode of operation, the method including the steps of:

using rendezvous protocol, a source compute node deterministically sending a request to send (RTS) message with a single RTS descriptor using an exclusive injection counter to track both the RTS message and message data to be sent in association with the RTS message, to a destination compute node, wherein the RTS descriptor indicates to the destination compute node that said message data will be adaptively routed to the destination node;

using one DMA FIFO buffer at the source compute node for maintaining RTS descriptors for rendezvous messages destined for said destination compute node to ensure proper message data ordering thereat;

using a reception counter at a DMA engine at the destination compute node to track reception of the RTS and associated message data thereat;

sending a clear to send (CTS) message from the destination compute node to the source compute node in a rendezvous protocol form of a remote get to accept the RTS message and message data; and processing the remote get (CTS) by the source compute node DMA engine to provide the message data to be sent.

2. The method as set forth in claim 1, wherein the step of sending the RTS message and message data and the step of sending the CTS message comprise a single handshake.

3. The method as set forth in claim 1, further comprising:
the source compute node determines whether its DMA engine there are available exclusive injection counters, and if not, said DMA engine determines whether, via said RTS message and message data to the destination compute node has available exclusive injection counters, and if said destination compute node acknowledges that it has an available exclusive injection counter via the CTS message, sending the message data associated with the RTS message with using the available exclusive injection counter at the destination compute node as a shared injection counter.

4. The method as set forth in claim 3, wherein upon receipt of the CTS message from the destination compute node identifying the exclusive injection counter to be shared, posting a remote get for min(rcvlen, sndlen) bytes for sending the message data using adaptive routing using a scheduled direct put.

5. The method as set forth in claim 4, wherein the DMA engine at the destination compute node notifies the source compute node at a time in which the exclusive counter counts down to zero, indicating that all data has been received and the message is complete.

6. The method as set forth in claim 1, further comprising:
the source compute node determine whether its DMA engine has available exclusive counters, and if so, determining, using the RTS message to determine whether the destination compute node includes available exclusive counters, and if not, the DMA engine at source compute node allocates an exclusive counter and includes in the message data a source buffer address, the size of the message data and the last byte comprising the message data.

7. The method as set forth in claim 6, wherein if the size of message indicated at the source compute node (sndlen byte) is less than or equal to the size of the message data indicated at the destination node (rcvlen byte), then the destination compute node sets the sndlen byte at the destination compute node to the last byte and polls for message completion.

8. The method as set forth in claim 7, wherein at the destination compute node, when the last byte of the message data changes, the destination compute node notifies the source compute node of completion of the message.

9. The method as set forth in claim 8, wherein at the destination compute node, if the size of message data indicated by the sender compute node (sndlen byte) is greater than the size of the message indicated at the destination compute node (rcvlen byte), then the destination compute node posts a remote get on its overflow reception counter and shared injection counter, where the remote get message data includes two (2) descriptors, the first of the two (2) descriptors for implementing a direct put from the source compute node to the destination compute node node including the message data, and the second of the two message descriptors which may compel the DMA engine at the destination compute node to either:
1) send a memory FIFO packet to the source compute node for arrival after the put message data arrival is completed at the destination compute node
2) placing a put to in a reserved memory location at the destination compute node and polling the memory location using an advance loop to determine when the message has completed; and
sending an acknowledgement from the destination compute node to the source compute node notifying the source compute node that only part of the message data payload has transferred.

10. The method as set forth in claim 1, further comprising:
the source compute node determining whether it has available exclusive counters, and if not, determining whether the destination node includes available exclusive counters, and if not, the source compute node sending the RTS message and message data using a shared injection counter at the source compute node, and a shared reception counter at the destination compute node, and including that the RTS message carries the last byte of the message data to be sent;
allocating the shared reception counter at the destination compute node in response to the RTS from the source compute node, and posting a remote get or CTS on the shared recption counter;
transferring the message data by the DMA engine at the source compute node using a direct put;
a DMA at the destination compute node polling the last byte of the message data for completion of the message at the destination node;
the DMA engine at the destination compute node sending an acknowledgment to the source compute node using at its shared injection counter indicating that the message is completed; and
receiving the acknowledgement at the shared injection counter at the source compute node.

11. The method as set forth in claim 1, further comprising:
the source compute node determining whether there are available exclusive counters at the source compute node, and if not, determining whether the destination compute node includes available exclusive counters, and if not, the sender sending the RTS message using a shared injection counter, where the RTS message carries the last byte of message data comprising the message;
allocating a shared reception counter at the destination compute node in response to receiving the RTS message from the source compute node, and posting a remote get or CTS message on the shared injection counter;
transferring the message data by the DMA at the source compute node using a direct put, in response to the remote get or CTS received from the destination compute node.

12. The method as set forth in claim 11, further including allocating a second shared reception counter at the destination compute node upon receipt of the RTS message and posting a second remote get or CTS on its shared reception counter to be processed by the source compute node;
transferring a last packet of the message data by the DMA engine at the source compute node using a second direct put, in response to the second remote get or CTS from the destination compute node.

13. The method as set forth in claim 12, further including sending an acknowledgment to the source compute node using the shared injection counter that the message has arrived to indicate that that the message transfer is completed.

14. A computer program product, the computer program product
comprising:
a tangible storage medium readable by a processing circuit and storing instructions for execution by the processing circuit for performing a method for message passing comprising the steps of:
using rendezvous protocol, a source compute node deterministically sending a request to send (RTS) message with a single RTS descriptor using an exclusive injection counter to track both the RTS message and message data to be sent in association with the RTS message, to a destination compute node, wherein the RTS descriptor indicates to the destination compute node that said message data will be adaptively routed to the destination node;
using one DMA FIFO buffer at the source compute node for maintaining RTS descriptors for rendezvous messages destined for said destination compute node to ensure proper message data ordering thereat;
using a reception counter at a DMA engine at the destination compute node to track reception of the RTS and associated message data thereat;
sending a clear to send (CTS) message from the destination node to the source node in a rendezvous protocol form of a remote get to accept the RTS message and message data; and
processing the remote get (CTS) by the source compute node DMA engine to provide the message data to be sent;
wherein the message is complete when the injection counter at said first compute node counts down to zero (0), and wherein the receive is complete when the reception counter at said destination compute node counts down to zero (0).

15. A parallel computer system comprising a plurality of interconnected compute nodes that includes message passing between said interconnected compute nodes, wherein each compute node comprises at least one processor, a memory and a DMA engine with counters that may be used either as shared or exclusive injection counters, and wherein the shared injection counters track the progress of many messages, while the exclusive injection counters track the progress of only one message.

16. The parallel computer system as set forth in claim 15, wherein to send a message, a source compute node sends an RTS message including at least one message descriptor, and wherein its exclusive injection counter tracks both the RTS message sent and message data sent.

17. The parallel computer system as set forth in claim 16, where the RTS message is sent deterministically and the message data are sent adaptively.

18. The parallel computer system as set forth in claim 17, wherein the RTS's at least one message descriptor indicates to the DMA engine that the RTS message must be sent deterministically.

19. The parallel computer system as set forth in claim 17, wherein the RTS includes a source buffer, message size, a metadata tag and a communicator.

20. The parallel computer system as set forth in claim 15, where a DMA engine at a destination compute node, upon receipt of the message sent, uses a reception counter to track progress of the message data.

21. The parallel computer system as set forth in claim 20, wherein the DMA engine at the destination compute node sends a remote get message to the source compute node in a form of a CTS message.

22. The parallel computer system as set forth in claim 15, wherein a destination node receives the message using a shared overflow reception counter in its DMA engine.

23. The parallel computer system as set forth in claim 15, wherein a remote get may be replaced by a memory FIFO send and a direct put by a processor at the destination mode.

24. The parallel computer system as set forth in claim 15, wherein acknowledgements may be replaced by direct puts instead of memory FIFO packets.

* * * * *